United States Patent Office 3,048,632
Patented Aug. 7, 1962

3,048,632
AMINODIBORON COMPOUNDS AND METHOD OF MAKING SAME
Robert J. Brotherton, Fullerton, and Lowell L. Petterson, Whittier, Calif., assignors to United States Borax & Chemical Corporation, Los Angeles, Calif., a corporation of Nevada
No Drawing. Filed Sept. 13, 1960, Ser. No. 55,706
14 Claims. (Cl. 260—551)

The present invention is a continuation-in-part of our invention bearing Serial Number 816,726, filed May 29, 1959, now abandoned.

This invention relates as indicated to aminodiboron compounds and has particular reference to tetra(alkylamino)diborons, tetra(arylamino)diborons and the method of preparing the same.

The present invention is based on a metathetical reaction involving transamination between aminodiboron compounds and an alkyl- or arylamine involving rupture of nitrogen-boron bonds and nitrogen-hydrogen bonds with simultaneous formation of new nitrogen-boron and nitrogen-hydrogen bonds as shown in the following general reaction:

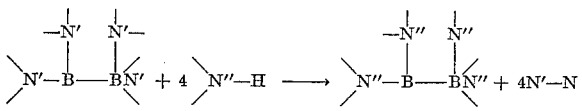

It has long been known to those skilled in boron chemistry that many reactions involving compounds having boron-boron bonds result in cleavage of the boron-boron bonds. However, we have found that aminodiborons (which compounds have boron-boron bonds) can be made to undergo transamination reactions without cleavage of the boron-boron bonds with the formation of new compounds.

It is therefore an object of this invention to provide new organoboron compounds having boron-boron bonds.

It is another object of this invention to provide a practical and economical method for the production of aminodiboron compounds.

Other objects will appear as the description proceeds.

To the accomplishment of the foregoing and related ends, said invention then comprises the features hereinafter fully described and particularly pointed out in the claims, the following description setting forth in detail certain illustrative embodiments of the invention, these being indicative, however, of but a few of the various ways in which the principle of the invention may be employed.

Broadly stated, the present invention comprises the method of producing organoboron compounds having boron-boron bonds which comprises the reaction of a first component having the general formula $$B_2(NR_2)_4$$

wherein R is a material selected from the class consisting of unsubstituted saturated aliphatic groups having at least one hydrogen on their α carbon atoms and unsubstituted saturated cycloaliphatic groups having a hydrogen on their α carbon atoms, with a second component selected from the group consisting of $R'_2NH$ and $R''NH_2$ wherein R' is a material selected from the class consisting of unsubstituted saturated aliphatic groups having at least one hydrogen on their α carbon atoms, unsubstituted saturated cycloaliphatic groups having a hydrogen on their α carbon atoms, phenyl and substituted phenyls having hydrogens in the ortho positions, said substituents selected from the group consisting of phenyl radicals, unsubstituted saturated alkyl groups having from 1-18 carbon atoms, unsubstituted saturated alkoxy groups having from 1-18 carbon atoms, chlorine, bromine and fluorine and R'' is a material selected from the class consisting of unsubstituted saturated alkyl groups having 1-18 carbon atoms, phenyl and substituted phenyls, said substituents selected from the group consisting of phenyl radicals, unsubstituted saturated alkyl groups having from 1-18 carbon atoms, unsubstituted saturated alkoxy groups having from 1-18 carbon atoms, chlorine, bromine and fluorine and the alkylamino group of said first component having a lower boiling point than said second component.

The above-mentioned tetra(alkylamino)diboron derived from secondary amines can be obtained by any of a number of methods. For example, by the reaction of tetrachloroborine with a dialkylamine, or by the reaction of a diaminohaloborane with an alkali metal.

From the foregoing broadly stated paragraph it will be seen that the aliphatic and cycloaliphatic groups of the amines have hydrogens on their α carbon atoms which exclude tertiary alkyl groups. When the second component is a secondary alkylamine it will be found that the presence of tertiary alkyls are again excluded and when the second component is a secondary substituted phenyl they must have hydrogens in the ortho positions. We have found these restrictions necessary to the present reaction, since both tertiary alkyl groups and substituents in the ortho positions of the phenyl have a steric effect which hinders the reaction and prevents the transamination from taking place. This does not, however, preclude the components from having mixed alkylamino groups. In the instance where the second component is a primary alkyl- or arylamine it will be seen that the foregoing restrictions are not necessary since we have found that there is no steric hinderance when only one R group is present. However, in any case, a combination of ingredients must be used where the alkyl- or arylamine entering the diboron containing molecule must have a higher boiling point than the alkylamino group leaving the diboron containing molecule during the transamination.

The foregoing can be illustrated by the following general reaction:

$$B_2(NR_2)_4 + 4R'R''NH \rightarrow B_2(NR'R'')_4 + 4R_2NH$$

when R'R''NH is a primary amine R' is hydrogen and R'' is alkyl, aryl or cyclic, and when R'R''NH is a secondary amine R' and R'' are aliphatic and cycloaliphatic having hydrogens on the α carbon atoms, phenyl or substituted phenyls having hydrogens in the ortho positions.

The following comprises a partial list of tetra(dialkylamino)diboron compounds applicable to the present invention:

Tetra(dimethylamino)diboron
Tetra(diethylamino)diboron
Tetra(di-n-propylamino)diboron
Tetra(diisopropylamino)diboron
Tetra(di-n-butylamino)diboron
Tetra(di-n-pentylamino)diboron
Tetra(di-n-hexylamino)diboron Due to cost and availability, in the preferred embodiment of the invention we use tetra(dialkylamino)diborons derived from amines having from 1-3 carbon atoms.

Referring now to the secondary amines, the following is a partial enumeration of applicable compounds:

| | |
|---|---|
| Dimethylamine | Dicyclohexylamine |
| Diethylamine | Di-n-hexylamine |
| Di-n-propylamine | Piperidine |
| Diisopropylamine | Diphenylamine |
| Di-n-butylamine | Di-p-tolylamine |
| Di-sec-butylamine | |

The following is a representative list of primary amines applicable to the present invention:

Methylamine
Ethylamine
n-Propylamine
Isopropylamine
n-Butylamine
Sec-butylamine
Tert-butylamine
Cyclopentylamine
Cyclohexylamine
Aniline
p-Toluidine We have additionally discovered that the present reactions can be catalyzed by the amine salts of strong protonic acids. It will be understood that these materials do not enter into the present reaction but are used in catalytic quantities to speed up the reaction. Thus any primary, secondary or tertiary amine salt of a strong protonic acid can be used to catalyze the present reactions.

The following is illustrative of the many amine salts of such strong protonic acids:

Methylamine-hydrochloride, hydrobromide, sulfate, trifluoroacetate
Ethylamine-hydrochloride, hydrobromide, sulfate, trifluoroacetate
n-Propylamine-hydrochloride, hydrobromide, sulfate, trifluoroacetate
Isopropylamine-hydrochloride, hydrobromide, sulfate, trifluoroacetate
Ammonium chloride, bromide, sulfate
n-Butylamine-hydrochloride, hydrobromide, sulfate, trifluoroacetate
Sec-butylamine-hydrochloride, hydrobromide, sulfate, trifluoroacetate
Tert-butylamine-hydrochloride, hydrobromide, sulfate, trifluoroacetate
n-Amylamine-hydrochloride, hydrobromide, sulfate, trifluoroacetate
Tert-amylamine-hydrochloride, hydrobromide, sulfate, trifluoroacetate
Hexylamine-hydrochloride, hydrobromide, sulfate, trifluoroacetate
Pyrrolo-hydrochloride, hydrobromide, sulfate, trifluoroacetate
Aniline-hydrochloride, hydrobromide, sulfate, trifluoroacetate
Pyridylamine-hydrochloride, hydrobromide, sulfate, trifluoroacetate
Thiophenylamine-hydrochloride, hydrobromide, sulfate, trifluoroacetate
Dimethylamine-hydrochloride, hydrobromide, sulfate, trifluoroacetate
Diethylamine-hydrochloride, hydrobromide, sulfate, trifluoroacetate
Di-n-butylamine-hydrochloride, hydrobromide, sulfate, trifluoroacetate
Di-isopropylamine-hydrochloride, hydrobromide, sulfate, trifluoroacetate
Allylmethylamine-hydrochloride, hydrobromide, sulfate, trifluoroacetate
Diphenylamine-hydrochloride, hydrobromide, sulfate, trifluoroacetate
Trimethylamine-hydrochloride, hydrobromide, sulfate, trifluoroacetate
Triethylamine-hydrochloride, hydrobromide, sulfate, trifluoroacetate
Tri-n-propylamine-hydrochloride, hydrobromide, sulfate, trifluoroacetate
Tri-isobutylamine-hydrochloride, hydrobromide, sulfate, trifluoroacetate
Trihexylamine-hydrochloride, hydrobromide, sulfate, trifluoroacetate
Triphenylamine-hydrochloride, hydrobromide, sulfate, trifluoroacetate
Pyridine-hydrochloride, hydrobromide, sulfate, trifluoroacetate So that the present invention can be more readily understood, the following examples are given:

I

Tetra(dimethylamino)diboron 4.00 g. (0.0202 mole) and n-hexylamine 8.17 g. (0.0808 mole) were heated from 24–115° C. for about 3 hours. Dimethylamine was removed using a dry nitrogen stream and trapped in aqueous hydrochloric acid. The resultant residue represented a 91% yield of tetra(n-hexylamino)diboron, $n_D^{25}$ 1.4606, as a colorless, non-volatile liquid.

Analysis. — (Calculated) $C_{14}H_{56}N_4B_2$: B, 5.11%. (Found): B, 5.20%.

II

A solution of 5.0 g. (0.025 mole) of tetra(dimethylamino)diboron and 13.04 g. (0.101 mole) of di-n-butylamine in 25 ml. of hexane was refluxed at about 76–174° C. in a nitrogen atmosphere for about 21 hours. The ensuing dimethylamine was bubbled through standard hydrochloric acid. Solvent and any unreacted starting material were removed by distillation at 0.1–0.5 mm. to give a 93.4% yield of tetra(di-n-butylamino)diboron, B.P. 170–183° C./0.55 mm., $n_D^{25}$=1.4667.

Analysis.—(Calculated) $(n-Bu_2N)_4B_2$: B, 4.05%; N, 10.48%; M.W., 534. (Found): B, 4.30%; N, 10.35%.

The molecular weight was found to be 557 (cryoscopic in benzene).

III

A solution of 10.3 g. (0.0607 mole) of diphenylamine and 3.0 g. (0.0152 mole) of tetra(dimethylamino)diboron in 25 ml. of toluene plus a catalytic amount of methylamine hydrochloride catalyst was heated at 100° C. for about 100 hours (the catalyst increased the speed of reaction at least two fold). The dimethylamine was removed in a stream of nitrogen and trapped in standard acid. The toluene was removed by vacuum distillation to give a 100% yield of tetra(diphenylamino)diboron, a green viscous liquid which contained 3.10% boron compared to the calculated value of 3.12% boron for tetra(diphenylamino)diboron. This product was soluble in benzene and chloroform and insoluble in n-hexane, bromoform and cold acetone.

IV

Tetra(dimethylamino)diboron 1 part, was heated with 4 parts of aniline. The reaction was conducted as described in Example I and the resultant product was a 95% yield of tetra(anilino)diboron.

The present compounds will be found to be useful additives as antioxidants in lubricants and as anti-knock agents in gasoline. These compounds will also find use as potent reducing agents in chemical reactions. Still further, the present compounds derived from reactions involving primary amines are useful chemical intermediates in the production of high temperature homopolymers and co-polymers.

Other modes of applying the principle of the invention may be employed, change being made as regards the details described, provided the features stated in any of the following claims or the equivalent of such be employed.

We, therefore, particularly point out and claim as our invention:

1. The method of producing aminodiboron compounds which comprises the reaction of a first compound having the formula $B_2(NR_2)_4$ with a second compound selected from the group consisting of $R'_2NH$ and $R''NH_2$ where; R is selected from the class consisting of alkyl groups of from 1–18 carbon atoms having at least one hydrogen on their α carbon atoms and cycloalkyl groups having from 3–7 carbon atoms in the ring and having a hydrogen on their α carbon atoms; R' is selected from the class consisting of alkyl groups of from 1–18 carbon atoms having at least one hydrogen on their α carbon atoms, cycloalkyl groups having from 3–7 carbon atoms in the ring and having a hydrogen on their α carbon atom, phenyl and substituted phenyls having hydrogen in the ortho positions, said substituents selected from the group consisting of phenyl, alkyl groups having from 1–18 carbon atoms, alkoxy groups having from 1–18 carbon atoms, chlorine, bromine and fluorine; R″ is selected from the class consisting of alkyl groups having from 1–18 carbon atoms, phenyl, and substituted phenyls, said substituents selected from the class consisting of phenyl, alkyl groups having from 1–18 carbon atoms, alkoxy groups having from 1–18 carbon atoms, chlorine, bromine and fluorine; and the alkylamino group of said first component having a lower boiling point than said second component.

2. The method of claim 1 wherein said reaction is catalyzed by the presence of an amine salt of a strong protonic acid.

3. The method of producing aminodiboron compounds which comprises the reaction:

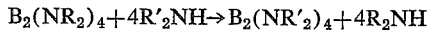
$$B_2(NR_2)_4 + 4R'_2NH \rightarrow B_2(NR'_2)_4 + 4R_2NH$$

where; R is selected from the class consisting of alkyl groups of from 1–18 carbon atoms having at least one hydrogen on their α carbon atoms and cycloalkyl groups having from 3–7 carbon atoms in the ring and having a hydrogen on their α carbon atom; R' is selected from the class consisting of alkyl groups of from 1–18 carbon atoms having at least one hydrogen on their α carbon atoms, cycloalkyl groups having from 3–7 carbon atoms in the ring and having a hydrogen on their α carbon atom, phenyl and substituted phenyls having hydrogen in the ortho positions, said substituents selected from the closs consisting of phenyl, alkyl groups having from 1–18 carbon atoms, alkoxy groups having from 1–18 carbon atoms, chlorine, bromine and fluorine; and the alkylamino group of said $B_2(NH_2)_4$ having a lower boiling point than said $R'_2NH$.

4. The method of producing aminodiboron compounds which comprises the reaction:

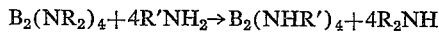
$$B_2(NR_2)_4 + 4R'NH_2 \rightarrow B_2(NHR')_4 + 4R_2NH$$

where; R is selected from the class consisting of alkyl groups of from 1–18 carbon atoms having at least one hydrogen on their α carbon atoms and cycloalkyl groups having from 3–7 carbon atoms in the ring and having a hydrogen on their α carbon atom; R' is selected from the class consisting of alkyl groups having from 1–18 carbon atoms, phenyl and substituted phenyls, said substituents selected from the class consisting of phenyl, alkyl groups having from 1–18 carbon atoms, alkoxy groups having from 1–18 carbon atoms, chlorine, bromine and fluorine; and the alkylamino group of said $B_2(NR_2)_4$ having a lower boiling point than said $R'NH_2$.

5. The method of claim 3 wherein said reaction is catalyzed by the presence of an amine salt of a strong protonic acid.

6. The method of claim 4 wherein said reaction is catalyzed by the presence of an amine salt of a strong protonic acid.

7. The method of producing tetra(n-hexylamino)diboron which comprises the reaction of tetra(dimethylamino)diboron with n-hexylamine.

8. The method of producing tetra(di-n-butylamino)diboron which comprises the reaction of tetra(dimethylamino)diboron with di-n-butylamine.

9. The method of producing tetra(diphenylamino)diboron which comprises the reaction of tetra(dimethylamino)diboron with diphenylamine.

10. The method of producing tetra(anilino)diboron which comprises the reaction of tetra(dimethylamino)diboron with aniline.

11. A composition selected from the class consisting of $B_2(NHR)_4$ and $B_2(NR'_2)_4$ where; R is selected from the class consisting of alkyl groups having from 1–18 carbon atoms, phenyl and substituted phenyls said substituents selected from the class consisting of phenyl, alkyl groups having from 1–18 carbon atoms, alkoxy groups having from 1–18 carbon atoms, chlorine, bromine and fluorine; and R' is selected from the class consisting of phenyl and substituted phenyls said substituents selected from the class consisting of phenyl, alkyl groups having from 1–18 carbon atoms, alkoxy groups having from 1–18 carbon atoms, chlorine, bromine and fluorine.

12. Tetra(n-hexylamino)diboron.

13. Tetra(diphenylamino)diboron.

14. Tetra(anilino)diboron.

References Cited in the file of this patent

FOREIGN PATENTS 57,783    Australia _____ Feb. 24, 1960

OTHER REFERENCES

Schechter et al.: Boron Hydrides and Related Compounds, Callery Chemical Co., Jan. 8, 1951, pp. 19 prepared under contract No. a(5), 10992, March 1951, Buaer, U.S. Navy (declassified December 1933).

UNITED STATES PATENT OFFICE
CERTIFICATE OF CORRECTION

Patent No. 3,048,632

August 7, 1962

Robert J. Brotherton et al.

It is hereby certified that error appears in the above numbered patent requiring correction and that the said Letters Patent should read as corrected below.

Column 4, line 12, for "$C_{14}H_{56}N_4B_2$" read -- $C_{24}H_{56}N_4B_2$ --.

Signed and sealed this 20th day of November 1962.

(SEAL)
Attest:

ERNEST W. SWIDER
Attesting Officer

DAVID L. LADD
Commissioner of Patents